United States Patent [19]

Dahlgren, Jr. et al.

[11] 4,437,150

[45] Mar. 13, 1984

[54] TOOL MANIPULATING METHOD AND APPARATUS FOR MULTIPLE JOB PROCESSING

[76] Inventors: William V. Dahlgren, Jr., 240 Dolores, Apt. 138, San Francisco, Calif. 94103; Lewis S. Silverstein, 695 Connecticut Ave., #4, San Francisco, Calif. 94107; Edward W. Claire, 5332 Shafter Ave., Oakland, Calif. 94618

[21] Appl. No.: 257,559

[22] Filed: Apr. 27, 1981

[51] Int. Cl.³ .................. G05B 19/42; B23Q 17/18
[52] U.S. Cl. ............................ 364/474; 364/171; 364/189; 409/84
[58] Field of Search ........... 364/474, 475, 167, 171, 364/189, 200; 409/76, 79, 80, 84, 85, 86, 96, 109; 112/121.11

[56] References Cited

U.S. PATENT DOCUMENTS

| | | | |
|---|---|---|---|
| 3,857,025 | 12/1974 | English et al. | 364/475 |
| 4,116,143 | 9/1978 | Manabe | 112/121.11 |
| 4,228,495 | 10/1980 | Bernhard et al. | 364/474 X |
| 4,240,119 | 12/1980 | Norton et al. | 364/900 X |
| 4,314,330 | 2/1982 | Slawson | 364/171 X |

*Primary Examiner*—Felix D. Gruber
*Attorney, Agent, or Firm*—Limbach, Limbach & Sutton

[57] ABSTRACT

A method and apparatus for manipulating an engraving tool in the processing of a plurality of jobs wherein an intelligent terminal processes data supplied by a user, the processed data being transferred to a control unit wherein the data is used to modify instructions from a master font located therein. Within the control unit, the modified master font instructions are transformed into drive signals which are then relayed to a mechanical tool manipulating means, wherein the mechanical tool is manipulated in response to the drive instructions.

21 Claims, 16 Drawing Figures

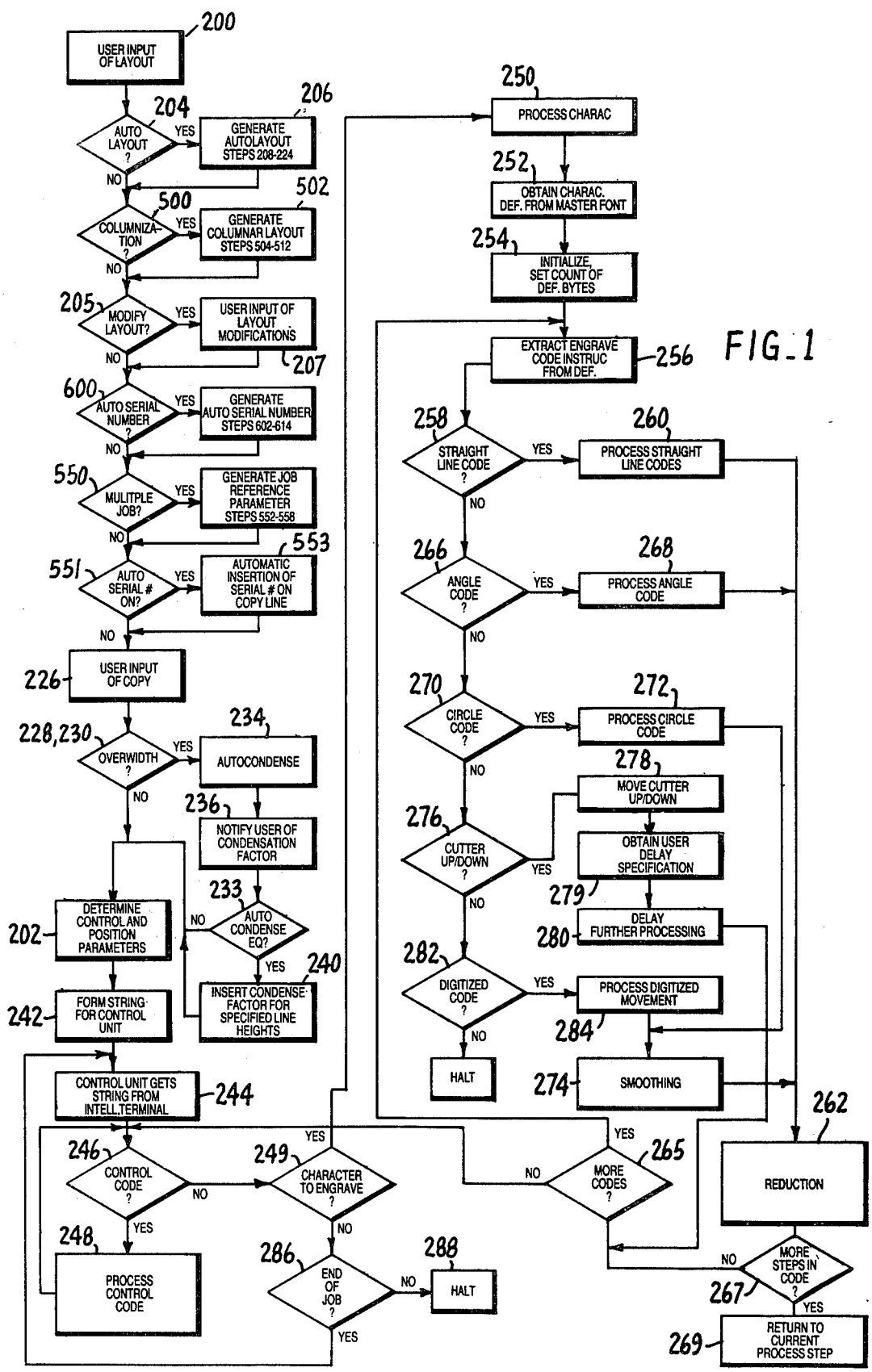
FIG_1

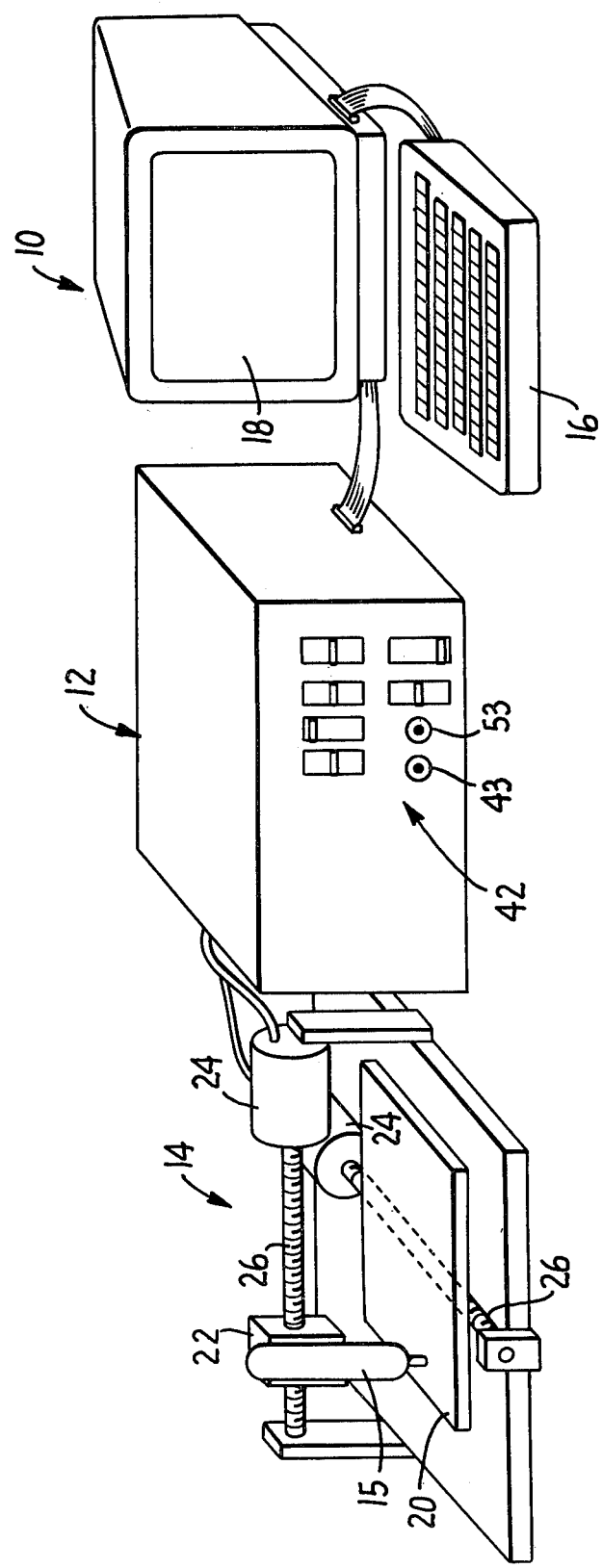
FIG._2.

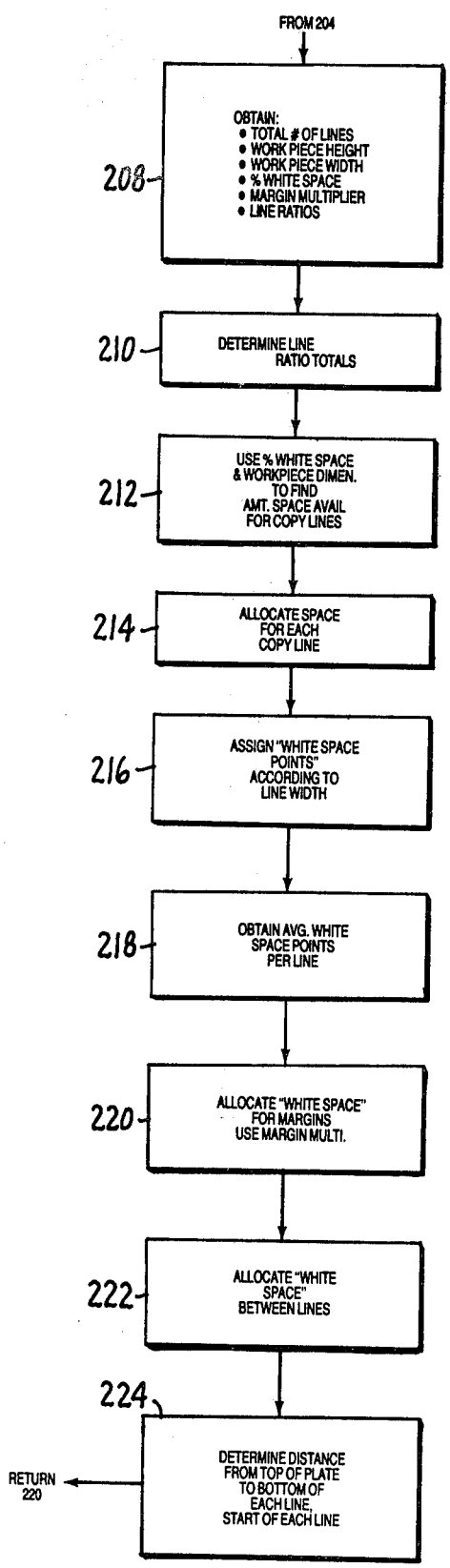
FIG.-3-
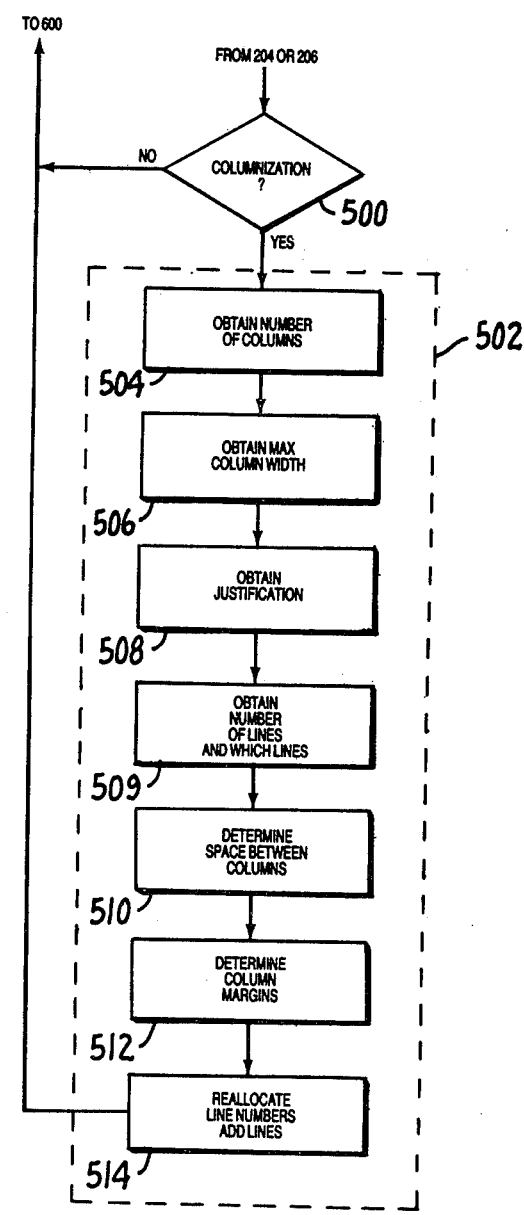
FIG.-6-

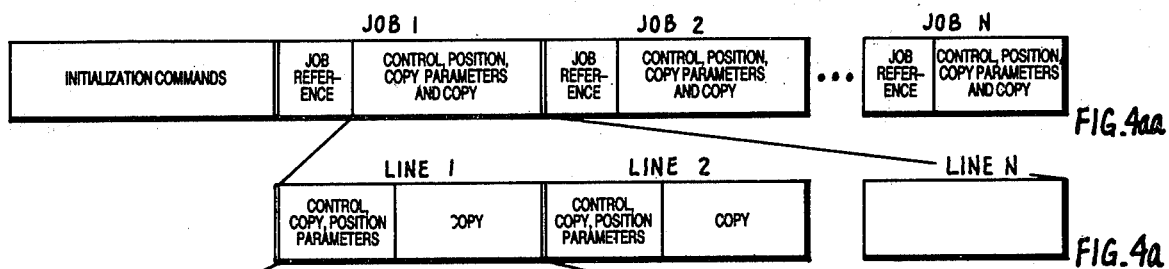
FIG.4aa
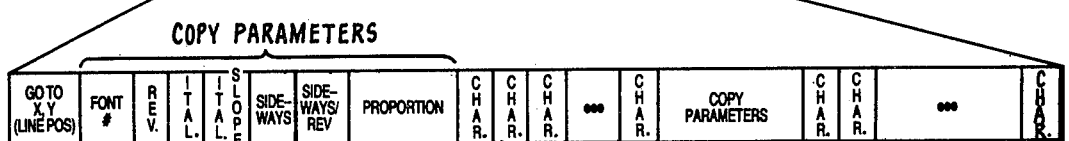
FIG.4a
FIG.4b
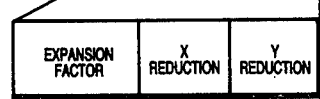
FIG.4c
FIG.4d
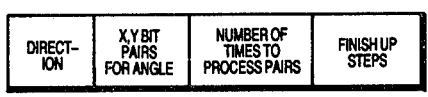
(1)
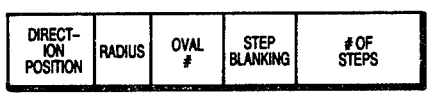
(2)
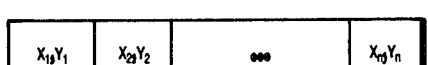
(3)
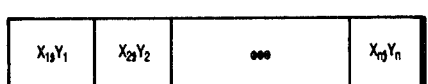
(4)
FIG.4e
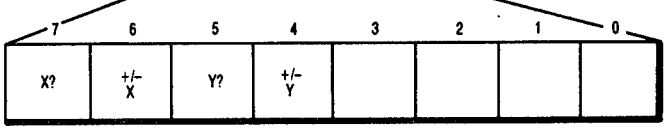
FIG.4f
FIG.4.

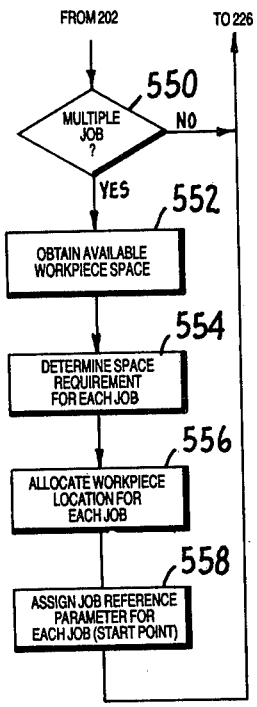
FIG_10
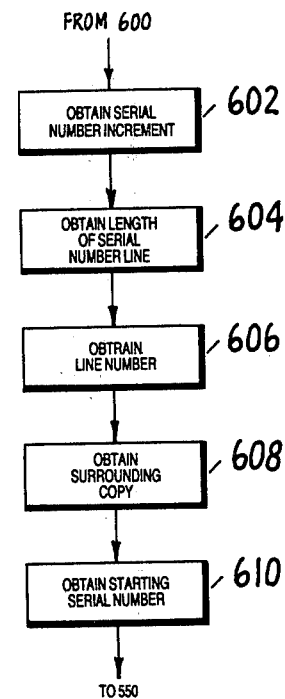
FIG_7

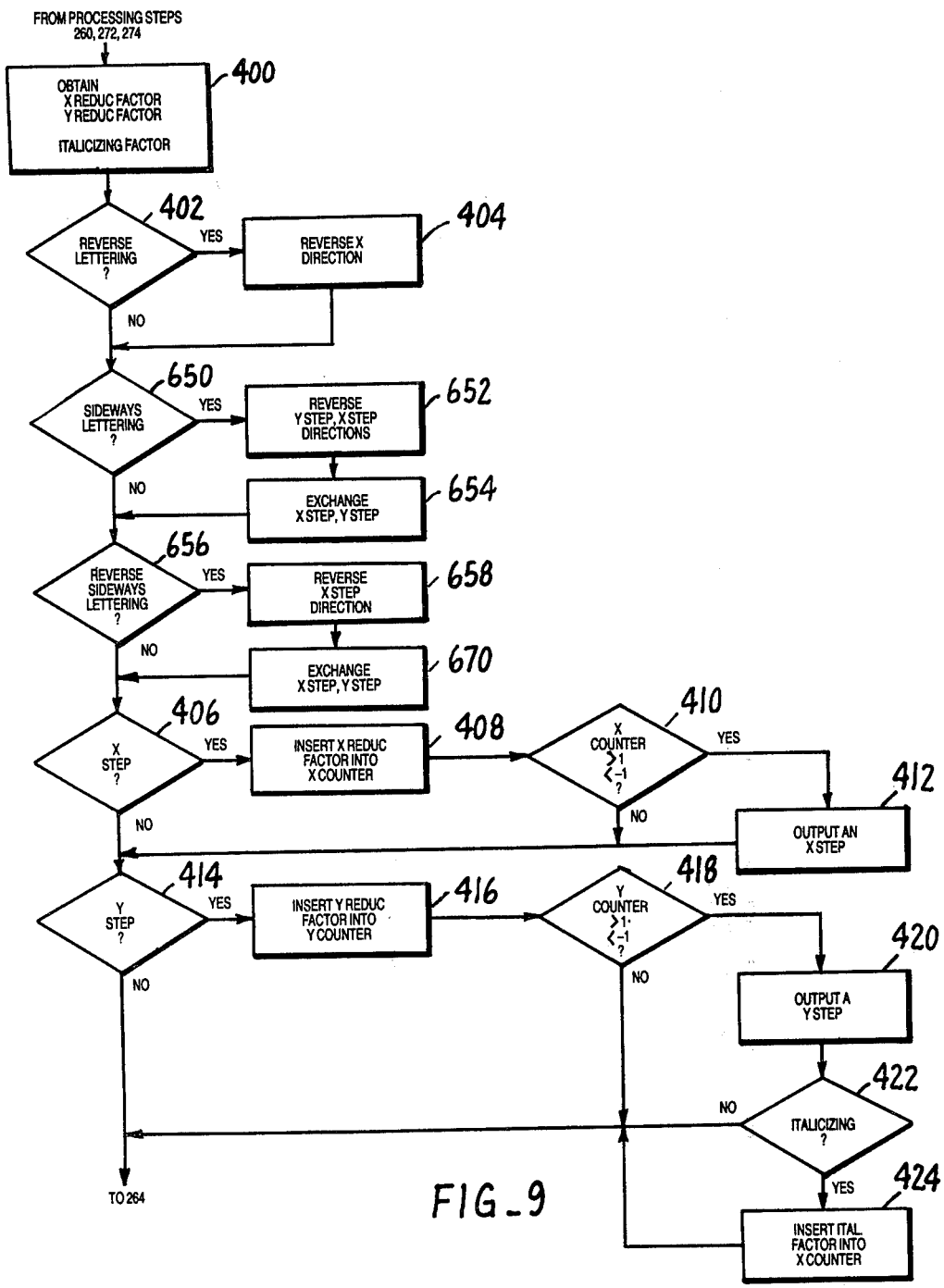
FIG_9

TOOL MANIPULATING METHOD AND APPARATUS FOR MULTIPLE JOB PROCESSING

BACKGROUND OF THE INVENTION

The present invention is directed generally to machine control and, particularly, to an engraving tool manipulating method and apparatus.

In the past, engravers have practised their trade using manually controlled engraving tools. Early engravers formed patterns and letters on a particular work piece in free hand. Eventually, the pantograph was developed in which templates bearing the characters and symbols of a particular font style were used to guide the engraving tool. In the pantograph, the engraving tool is positioned over the work piece and is attached by an arm to a tracing pin. A template of the copy or information which is to be engraved on the work piece is set up on a separate surface using the template forms. As the tracing pin traces the outline of each letter in the set up copy, the engraving tool is guided over the work piece in the corresponding pattern. In this manner, the patterns of the copy set up are transferred to the work piece.

Even with the advent of the pantograph, engraving remains no less an art. This is because engraving requires not only the precise reproduction of font styles on the work piece, but also an aesthetically pleasing positioning of the various lines and symbols within the work piece. In the past, an engraver's ability to generate a satisfactory product was a function of numerous years of experience and experimentation. In the usual engraving task, the engraver creates the layout and selects the font style intuitively. It is only after this intuitive creation is engraved on the workpiece that any errors or imbalances will appear. For example, should the engraver have miscalculated the length of a line of copy for a given character height and font style, the whole job would have to be started over. Alternatively, the engraver could reduce the line heights which in turn will reduce copy line width. This, however, can destroy the balance of the layout. The engraver can also resort to abbreviations, but at the expense of eliminating copy which was originally sought to be engraved. In the actual engraving of the copy onto the workpiece, stylus slips errors can occur at any time, and often appear after a substantial amount of engraving has already been completed creating costly scrap. Often, the engraver discovers, after finishing the piece, that the line spacing that was selected left an overall imbalance in the appearance of the piece. Flourishes are often used to fill in the extra space. It is not unusual, when a large number of similar pieces are being engraved, with only a portion of the copy being changed for each piece, to suddenly come across a name, for example, which is too long for a given character height, workpiece width and font style chosen. In such a situation the engraver could redo the layout using a different font style, or engrave the new copy in a smaller font style. In either case the appearance of the piece will be noticeably changed with respect to the other pieces.

Additionally, if there is a large amount of copy which is to be transferred to the work piece, the number of lines which can be set up at any one time is limited by the number of letters of the particular font style which is on hand. In such case, the full layout and copy cannot be set up thereby hindering checks for errors or miscalculations in the layout.

In the machining art, chunks of metal are drilled, lathed, milled and cut to form finished mechanical parts. Often, the machines used in these operations are controlled numerically. Typically, these numerical control (NC) machines accept a paper tape, for example, upon which is located a number of coded instructions. These instructions are a sequence of codes, each code causing the machine to move in a particular direction. Alternatively, magnetic tape, electronic memory or the like can also be used to hold these instructions.

These control tapes are typically developed in the following manner. A programmer, upon examining a model part and reviewing the machine steps necessary to form such a part, transcribes the operations into a sequence of machine movements. This sequence of machine movements are then transferred to the tape in coded form. NC machines have primary application in heavy industry and are typified by a large physical size, high cost, and complexity. Additionally, a significant amount of experience and/or training is required to produce a competent NC programmer. As such, NC machines and the engraving arts are incompatible, both from the standpoint of the expense involved and the complexity of adapting and operating such a machine in a typical engraving application.

REFERENCE TO A COMPUTER PROGRAM

Listings of computer programs have been submitted in form of an Appendix A and Appendix B. These appendices are not printed as part of the specification but form part of the application.

SUMMARY OF THE INVENTION

The foregoing and other problems of prior art engraving apparatuses and techniques for use in the engraving arts are overcome by the present invention of a method and apparatus for manipulating an engraving tool of the type in which the tool is manipulated by electronic means to transfer copy information supplied by a user to a work piece. The method includes the steps of generating position, control, and job reference parameters based upon user-supplied dimensional data; generating copy parameters from the dimensional data and user-supplied copy data; and transferring the position, control, job reference, and copy parameters and user copy to control means, wherein the dimensional and copy information originate from a plurality of separate and distinct jobs.

Following the parameter transferring step, are the steps of transforming the position, control, and job reference parameters into drive signals; obtaining master copy instructions, which correspond to the user copy, from a master font memory within the control means; modifying the master font instructions according to the copy parameters; converting the modified copy instructions into drive signals; and transferring all drive signals to tool manipulating means.

Following the drive signal transferring step are the steps of positioning the tool in accordance with the position and job reference drive signals; and manipulating the tool in accordance with the control and modified copy instructions drive signals, so that a number of separate and distinct jobs can be performed on the workpiece. In the preferred embodiment of the present invention, the job reference parameter is combined as part of the position parameter. A separate job reference parameter can be sent to the control unit with similar results.

This feature permits a substantial number of jobs to be entered into the system at one time, thereby saving much user (or operator) time. For example, instead of a single name badge being engraved on a pre-cut blank, pursuant to an exchange of parameter and copy from the intelligent terminal to the control unit, a large number of name badges can be engraved on a large blank, and then cut to size after engraving is completed. This permits the system to engrave a job virtually unattended, thereby allowing significant savings in operator time. Where variable copy is being engraved, i.e. where a small part of the copy is changed for each job, the savings are quite substantial. For fixed copy, the savings can be even greater.

One system which implements the above method comprises an intelligent terminal, a control unit, and mechanical means for manipulating the tool. The intelligent terminal receives the information from the user and generates the position, control, job reference, and copy parameters.

The control unit is communicatively coupled to the intelligent terminal and receives the position, control, and copy parameters and copy. The control unit includes master font memory means which hold the font definitions. Also included are processing means for interpreting the control, position, and job reference parameters; for modifying the master font definitions from the memory means in accordance with the copy parameters; and for generating drive signals. The tool manipulating means are responsive to the drive signals from the control unit, so that the positioning of the tool is manipulated about and the tool operates upon a work piece as directed by the drive signals from the control unit.

As applied to the engraving art, in the above tool manipulating apparatus and method, the user supplied dimensional data takes the form of layout information, including workpiece size, line heights and positions, and margins and justification of copy, number of jobs, and space between jobs. The user supplied copy information includes font style, modifications to the font style, and the characters, symbols and figures which are to be engraved in the workpiece. Based upon the layout information, position, control, and job reference parameters are generated which eventually are used to direct the positioning and operative state of an engraving tool with respect to the workpiece to be engraved. The copy parameters are generated based upon the layout and copy information. Copy parameters include expansion and reduction factors, italicizing directives and reverse, sideways, and reverse/sideways lettering directives, which are used to determine the form in which the user copy is engraved on the workpiece.

The master font memory in the engraving system control unit includes various lettering and symbol fonts and tables. In the present invention, the master font library contained within the control unit can be supplemented by an additional font or a special engraving pattern which can be temporarily stored in the control unit, and which is input into the control unit through the intelligent terminal. These fonts contain definitions by which characters, in the particular font style, each of which have a predetermined height and width, can be engraved. The definition of a single character comprises a sequence of codes, each code indicating a particular type of cutter movement, for example, a straight line, an angle, or a circle, and the direction of such movement, for example, up, down, left, right, clockwise or counter-clockwise. The copy parameters are used to modify these font definitions so that copy of the desired dimensions and form are engraved in the workpiece. As such, a wide number of variations can be generated from a single definition of a character of a particular font style. The control and position parameters are converted into drive signals by the control unit. These drive signals take the form of stepping motor coil sequences and engraving tool up/down commands. The modified font definitions are also converted by the control unit into stepping (or stepper) motor coil sequences and engraving tool up/down control.

In the engraving system, the tool manipulating means includes an X-axis driving means and a separate Y-axis driving means. The engraving tool is mounted to the X-axis driving means. An engraving table, which holds the workpiece, is mounted to the Y-axis driving means. Each driving means includes a stepper motor which is responsive to drive signals from the control unit. Each stepper motor in turn rotates a lead screw in minute steps which in turn causes movement of the workpiece and engraver along their corresponding axes.

In the engraving system of the present invention, one feature of the layout generating means, within the intelligent terminal, permits the user to enter a minimal amount of information, including a "number of columns" specification, a "maximum column width" specification, a "justification" specification, a line count, and work piece dimensions, which are then used to automatically generate a columnar layout. As such, the tedious layout manipulation typically required in generating a columnar layout is greatly reduced and the possibility of errors eliminated.

Another feature of the present invention permits the operator to enter serial number specifications so that a line of copy bearing a designated serial number is automatically generated on subsequent renditions of the same job, this line of copy being included as a part of the user copy material, and the serial number being automatically incremented for each succeeding job.

The processing means within the control unit can manipulate the master font definitions supplied from the font memory means so that a plurality of dimensional patterns of a particular character can be generated from a single master font definition in the font style of that character. This includes modifying the orientation in which the character is actually engraved on the workpiece so that sideways and reverse/sideways lettering can be engraved. The processing means modify the master font definition for each character specified in the copy according to the copy parameter supplied from the intelligent terminal. The control means also translate the processed control and copy information into drive signals which can be understood by the tool manipulating means. One feature of the control means of the present invention is an adjustable processing delay which permits the user to adjust the amount of time by which further processing of the current job is delayed whenever the cutter is being raised from or lowered to the workpiece. This permits the operator to optimize the amount of the delay according to the particular engraving conditions for the particular job being engraved.

Because of the functional layout of the various elements of the present computer controlled system, engraving of a particular layout and copy can be in progress, under the control of the control unit, while the intelligent terminal is receiving the next layout and copy information package. The job reference parameter generating capability of the present invention permits a plurality of jobs to be included in one parameter and copy information transfer between the intelligent terminal and the control unit. Features such as sideways and reverse/sideways lettering can be easily implemented in the present invention because of the two dimensional, quantity-and-direction-formats of the master fonts, which are modifiable by user-selected or system generated parameters. In contrast to previous engraving or NC machine procedures and apparatus, minimal operator skill is required to produce works of high quality. What is more, the amount of time to produce this work is greatly reduced.

It is therefore an object of the present invention to provide a method and apparatus for manipulating a tool or machine in the performance of a plurality of separate and distinct jobs on the workpiece.

It is a further object of the present invention to provide a tool manipulating apparatus including an intelligent terminal, a control unit, and a tool manipulating means wherein information supplied by a user is accepted by the intelligent terminal and placed in a control, position, job reference, and copy parameter format, which is then supplied to a control unit, the control unit having master font information which is modified by the copy parameters supplied by the intelligent terminal, and further wherein the modified font information and copy, position, and job reference parameters are supplied to the tool manipulating means for the actual manipulation of the tool with respect to the work piece.

It is another object of the present invention to provide a tool manipulating method and apparatus wherein engraving columnar layouts can be automatically generated according to general, user-supplied information of a graphic design and artistic nature.

It is a still further object of the present invention to provide a tool manipulating method and apparatus wherein a line of copy in an engraving layout is automatically and iteratively generated, according to user supplied specifications, to provide an automatic serial numbering feature.

It is a still further object of the present invention to provide a engraving tool manipulating method and apparatus wherein a master font definition can be modified to provide, for each character defined in the master font, sideways, and reverse/sideways engraved lettering orientations for the particular character or, if required, resolution to thousanths of an inch.

It is a still further object of the present invention to provide a tool manipulating method and apparatus wherein an intelligent terminal generates a first plurality of sets of control, position, job reference, and copy parameters which are transferred to a control unit, each set corresponding to a separate and distinct job, and further wherein, upon transfer of such information to the control unit, the intelligent terminal can accept further user-supplied information while the control unit proceeds to process and direct a mechanical tool manipulating means in accordance with the first set of control and copy parameters.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a simplified diagram illustrating the generalized steps involved in the processing of user-supplied information for controlling an engraving tool.

FIG. 2 illustrates the interconnection of the intelligent terminal, the control unit, and the engraving tool manipulating means which implements the method of controlling an engraving tool.

FIG. 3 is a flow diagram illustrating the processing of user-supplied information to automatically generate a layout.

FIG. 4, comprising 4aa, 4a to 4f, illustrates the format of the control, position, and copy parameter information which is transferred from the intelligent terminal to the control unit, and a master font character definition format.

FIG. 6 is a generalized flow diagram illustrating the processing of user-supplied information to automatically generate a columnar layout.

FIG. 7 is a generalized flow diagram illustrating the processing of user-supplied information to automatically generate a serial number for engraving on the workpiece.

FIG. 9 is a generalized flow diagram illustrating the reduction process in the control unit.

FIG. 10 is a generalized flow diagram illustrating the multiple job processing procedure of the present invention.

DETAILED DESCRIPTION OF THE PREFERRED EMBODIMENT

Figure 5:
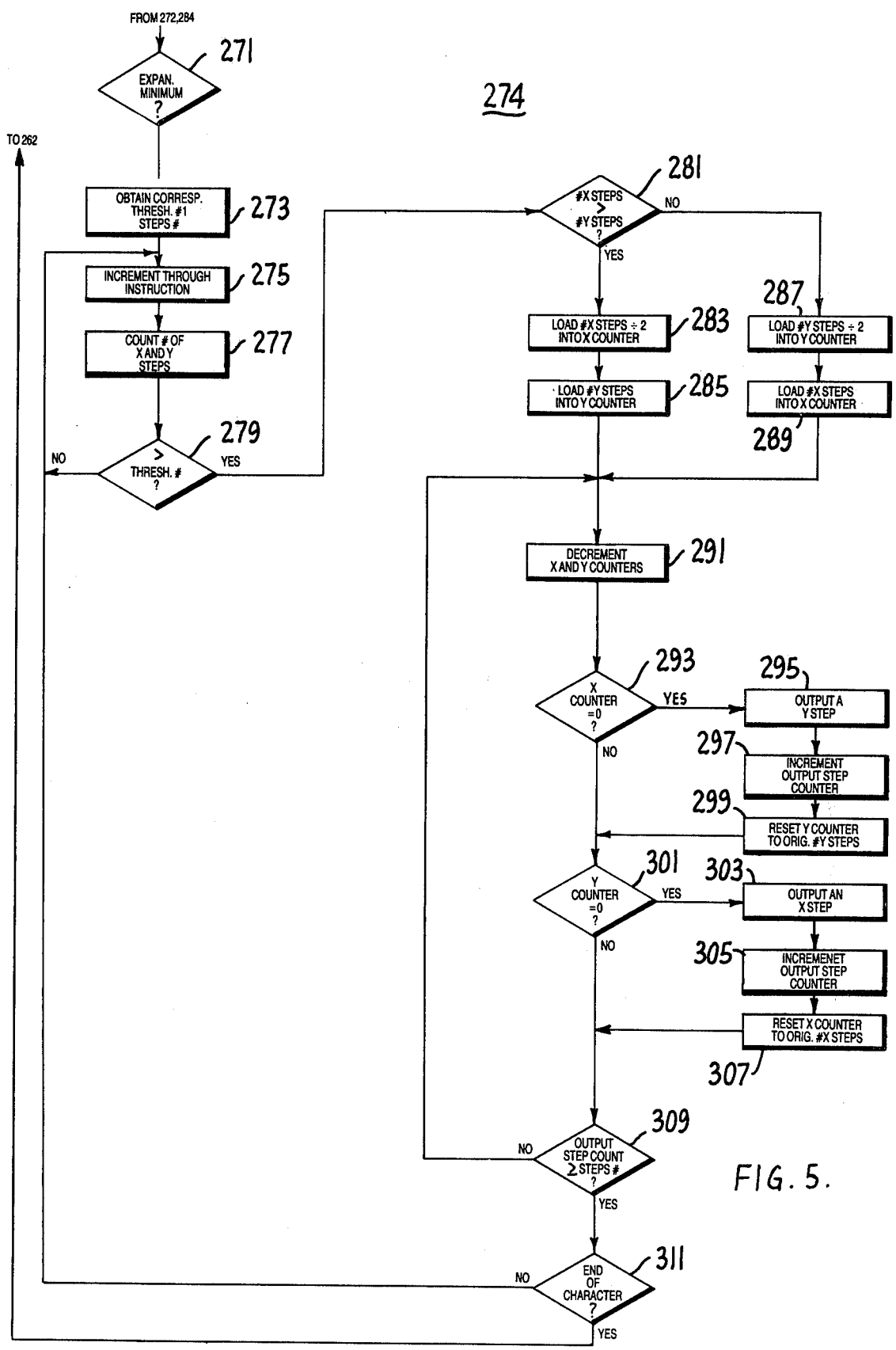
FIG. 5 illustrates the operation of smoothing a circle character pattern whenever a circle character or digitized part is enlarged.

In the preferred embodiment, the method of the present invention is directed to the control of an engraving tool and an engraving process. FIG. 1 is a simplified flow diagram of this method, FIG. 2 illustrates an apparatus configuration which implements this method. The method for engraving and for controlling an engraving tool will now be discussed with references to FIGS. 1 and 2.

An intelligent terminal 10, a control unit 12, and an X-Y engraving table 14 interact with each other. The intelligent terminal 10 receives information from the user via a keyboard 16. This information is displayed on a screen 18. The intelligent terminal 10 interprets the user-supplied information to assemble layout formats, and copy parameters. The layout formats are then converted into control and position parameters.

In the multiple job embodiment of the present invention, a plurality of jobs is designated by the user. The intelligent terminal 10 generates a job reference parameter for each job. These job reference parameters direct the control unit 12 to engrave the particular job at a particular position on the workpiece. These job reference parameters are also supplied to the control unit 12.

The control unit 12 receives these parameters and the copy to be engraved from the intelligent terminal 10 and converts this information into drive signals which are used to manipulate the position of the tool in the X-Y engraving table 14. This conversion of parameters by the control unit 12 is divided into at least two parts, the first part being conversion of control and position parameters into drive signals to direct the tool in the X-Y table to a certain position with respect to the work piece. The second part includes interpretation of the copy parameters to modify the master font definitions for the specified copy so that characters of the desired height and orientation can be generated. These interpreted copy parameters are then converted into drive signals which direct the tool in the X-Y table 14 to engrave the desired copy onto the work piece.

In the preferred embodiment of the present invention, the X-Y table 14 includes a table 20 for holding the work piece, the table 20 being moveable in a first linear direction. The X-Y table 14 also includes a mounting fixture 22 which is moveable in a second linear direction which is perpendicular to the first linear direction. In this manner, an X-Y type coordinate system is implemented by which X-axis signals supplied by the control unit 12 cause the mounting fixture to move in an X direction, while Y-axis signals supplied by the control unit 12 cause the table to move in a Y direction. The engraving tool 15 can thus be moved with respect to the work piece in an X direction, a Y direction, or a direction determined by the magnitude of movement in each of the X and Y coordinate directions. In the preferred embodiment of the present invention, stepping (or stepper) motors 24, which drive lead screws 26, are used to position the mounting fixture 22 and the table 20 with respect to each other. In an alternative embodiment, the table can be driven both in the X and the Y coordinate direction with satisfactory results.

The present invention, is layout defined. That is, the layout of the copy to be engraved is first determined, the dimensions of the layout thereafter determining the modifications to the master font definitions which will be necessary to permit the copy to fit within the layout. Step 200, in FIG. 1, corresponds to the layout determination operation and is implemented in the intelligent terminal 10. In this step, the user supplies layout factors which include: (1) For each plate—the number of lines, and the plate (or workpiece) size; and (2) for each line—the letter height, the left margin dimension, the right margin dimension, the distance of the bottom of the line from the top of the plate, and whether the copy on the line is to be centered, or left or right justified. Given these layout factors, the intelligent terminal 10 will be able to, after copy entry, convert these factors, in step 202, into control and position parameters, which will be interpreted by the control unit 12 to direct the movement of the engraving tool in the tool manipulating means 14. The tool is thereby directed to a position on the work piece which corresponds to the start of each line. From the letter height layout factor, the terminal determines the amount by which the master font definition corresponding to the particular line of copy must be increased or decreased in order to generate characters of the desired height. From the left and right margin layout factors and the workpiece width, the terminal 10 determines the maximum line width. These maximum line widths are used in the generation of copy parameters in the copy input steps which follow.

The method of engraving of the present invention includes an automatic layout generating process by which a layout can be generated from generalized, user-supplied information of a graphic design and artistic nature. In step 204 of FIG. 1 a determination is made whether this automatic layout function has been selected by the user. If so, a layout is generated in step 206 from user supplied information which includes: a "white space" specification, a "margin multiplier" specification, a "line ratio" specification, a line count, and workpiece dimensions.

Referring to FIG. 3, the process by which a layout is generated from the above identified information will be described. In step 204 the intelligent terminal 10 obtains, as before, the total number of lines of copy and the workpiece dimensions. However, in lieu of the distance from the workpiece top data, the line height data, and the line margin data obtained for normal layout mode, the terminal 10 obtains a percentage white space specification for the workpiece, a margin multiplier specification, and a line ratio specification for each line.

These three specifications are descriptive of an engraved workpiece from a visual perspective. Percentage white space describes the ratio of the vertical space of the workpiece which is left unengraved, to the total vertical space of the workpiece. The margin multiplier is the ratio of the margin area white space to the average white space between lines of the engraved workpiece. The line ratios specify the proportions of the line heights of each line to one another.

After the required specifications are obtained in step 208, the line ratios are totalled in step 210. In step 212 the workpiece dimensions and the percentage white space are used to determine the total workpiece area available for engraving. In step 214 the workpiece area available for engraving is allocated for each line by using the line ratio totals from step 210 to obtain an engraving - area per total-line-ratio quantity. Thereafter the original specified line ratio for each line is applied to the engraving area per total-line-ratio quantity to allocate a line-height for each line.

Step 216 involves the allocation of white-space points to each line, according to the line height of each line. Top and bottom lines receive only ½ units apiece while the intermediate lines receive one unit apiece. Each unit corresponds to the line height of the line for which the white space is allocated. These units are then applied to the height of the line to which they correspond to yield white-space points for each line. In step 218 the average of the white-space points between lines is obtained. In step 220 the margin multiplier specification is applied to the average of the white-space points to yield a margin-space point allocation.

Step 222 involves the actual allocation of white-space between each line and to the margins by first determining a white-space multiplier. The white-space multiplier is determined by comparing the total white space allocation to the total of the white-space points between the lines and the top and bottom margin-space points. This white-space multiplier is then applied to the white-space points for each line to yield actual white space between each line, and to each margin-space point to yield actual margin-space.

Finally, in step 224, the margin-space, white-space and line height quantities are combined to yield: margin dimensions, and for each line—distance from the bottom of the line to the top of the plate. Once step 224 has been completed, the terminal proceeds to step 226 for user copy-entry and eventually to step 202, FIG. 1, wherein control and position parameters are determined, as in the non-autolayout mode.

Another feature of the present invention includes the automatic generation of a columnar layout. This case often arises when columns of numbers or words are sought to be displayed. The user supplies generalized information including the number of columns, the maximum column width, and the type of justification to be used in each column. Referring to FIGS. 1 and 6, this columnization process will be further explained. After the auto-layout step 204, a determination is made as to whether a columnized layout has been requested, step 500, if so, a columnar layout is generated in step 502. In FIG. 6, the columnization procedure is illustrated. In step 504, a "number of columns" specification is obtained from the user. In step 506, a "maximum column width" specification is obtained for each column specified in step 504. In step 508, a "justification" specification is obtained for each column specified in step 504. In step 509, the number of lines in each column are obtained along with the line numbers to be columnized. In step 510, the space between the various columns is determined. This space determination is utilized in step 512 to obtain column margins for each column. In step 514, the layout is expanded and renumbered to include the new lines generated by columnization. After step 514, the procedure returns to the main processing loop, more specifically to step 202. Thereafter, the line margin, justification, and line number are used just as is any other user or machine generated layout data to determine control and position parameters.

After control and position parameters are determined in step 202, the terminal proceeds to step 550 in which it is determined whether a multiple job mode has been requested. See FIG. 10. If so, the terminal proceeds to step 552 in which the available space in the workpiece is determined. This information is derived from the workpiece dimensions. In step 554 the terminal determines the space requirement for each job. In step 556, the available workpiece space is allocated for each job. In step 558, a job reference parameter is assigned to each job. This job reference parameter is a position on the workpiece at which the particular job is to start. In this manner, the job reference parameter can be used to direct the engraving tool to the point on the workpiece corresponding to the starting point for the particular job. Thereafter, the position and control parameters determined in step 202 can be used, referenced to the job reference parameter, to direct the engraving tool through the steps required for engraving the particular job. Once the job reference parameter has been assigned, the terminal returns to the main processing loop and to step 226 in which the terminal retrieves the user copy input.

Structuring the manipulation of control, position, and job reference parameters in the above manner permits much versatility. For example, if the job parameter is made the same for each job specified, a batch of jobs can be sent over to the control unit, and thereafter used to direct a sequence of operations in which the control unit directs the engraving tool to engrave the various jobs starting at the same point, with the workpiece being changed after each job is completed. This requirement often arises where name badges are being engraved on pre-cut blanks. The operator can input the various jobs sought to be engraved, specifying the same job parameter for each job, and thereafter transfer the batch of jobs to the control unit. The operator can then initiate the start of the engraving, leaving the changing of the pre-cut workpiece blanks to an unskilled operator, while entering the next series of jobs, or directing his or her attention elsewhere.

An additional feature in the multiple job processing embodiment of the present invention is an automatic serial number numbering feature. This auto serial numbering feature permits the user to enter a serial number specification after which a line of copy is automatically generated by the present invention and included as part of the copy which is engraved on to the workpiece. The serial number specification includes an "increment" specification, a "line number" specification, a "surrounding copy" specification, a "length" specification, and a "starting number" specification. After the columnization decision step 500, the terminal in step 600, determines whether the auto serial number feature has been requested by the user. Referring to FIG. 7 this automatic serial numbering feature will be described in greater detail. In step 602, the terminal obtains the serial number increment from the user, the serial number increment being used to increment the serial number to be assigned to each subsequent job processed. In step 604, the number of digits of the serial number is obtained. In step 606, the line number at which the serial number is to appear is obtained from the user. In step 608, the user is permitted to insert copy which is to surround the serial number. For example, the words "serial number" can be inserted in front of the serial number itself, alternatively, the serial number can be embedded within a line of copy, the serial number being the only portion of the copy which is changed from job to job. Following step 550, the serial number, if auto serial number is selected as determined in step 551, is actually inserted into the copy.

Included in the copy information is the copy, itself, which is to be engraved, along with a font designation, a condensation factor, an autocondense equalization instruction, a reverse lettering instruction, and an italicizing instruction.

The reverse lettering instruction is utilized in the method of the present invention in determining the position parameters. In reverse lettering, the engraving tool (or cutter) is positioned over the workpiece at what normally is the end of the copy line, from which point the copy line is engraved in reverse. That is, the copy is processed as it is supplied by the user, except that the letters are engraved backwards, or from right to left instead of the normal left to right orientation. Reverse lettering is especially useful where engraving is to be done on the backside of a transparent plate, so that when the plate is viewed from the front side, the copy is correctly oriented. In reverse lettering, therefore, a position parameter is generated to position the cutter to what is normally the end of a copy line, so that reverse engraving can be implemented. The condensation or expansion factor designates the amount by which the width of the characters within a particular line of copy is to be reduced or enlarged. If a condensation factor of 100% is specified, the width of each character in the line will be a function of the amount the master font definition of the character had to be changed in order to meet the line-height requirements of the layout section.

Also included within the copy information are a sideways lettering instruction, and a sideways/reverse lettering instruction. The sideways lettering instruction is utilized in the method of the present invention in determining position parameters, as with the reverse lettering instruction. In sideways lettering, the engraving tool is positioned over the workpiece beginning in the lower left corner and the copy is engraved from bottom to top, as opposed to the normal left to right direction.

This permits the engraving of workpieces which have dimensions not compatible to the particular engraving table. That is, in the preferred embodiment of the present invention, the typical engraving table is wider than it is high. In the case where a workpiece is sought to be engraved wherein its height is greater than its width, and the copy is to engraved along is width dimension, the workpiece can still be engraved using the table size available. Because the user supplied copy is engraved by the present invention in the order in which it is received from the user, a position parameter is generated to position the cutter (or engraving tool) to what will be the bottom of the finished workpiece, or the lower left hand corner of the workpiece. The sideways engraving instruction is utilized within the control unit to modify the X and Y step and directive instruction for the copy as the copy is being processed.

The sideways/reverse lettering instruction is similiar to the sideways lettering instruction in result, however not only are the letters engraved sideways from top to bottom, but the letters are also reversed in their orientation. In this manner, engraving of transparent plate workpieces which are of odd dimensions, with respect to the engraving table, can be accomplished. As with sideways and reverse lettering instruction, the sideways/reverse instruction is utilized by the control unit to modify the X and Y steps and directives corresponding to the copy as they are processed by the control unit.

From the copy received from the user, the intelligent terminal determines the line width for each line specified, step 228. Should the width of the copy exceed the line width calculated in the layout section, step 230, a condensation factor which will permit the copy to fit within the line and designated as a copy parameter, step 234, width is automatically selected by the autocondense feature and the user is so informed, step 236. Because the font definitions are implemented in an X-Y coordinate format, the height of the character can be varied independently from the width of the character and vice versa. The operator, upon receiving the line-width-exceeded indication from the intelligent terminal can specify that the width of the character in the particular line be reduced even further. This factor will then be included in the copy parameters which are relayed to the control unit 12, so that the master font definitions used to actually to engrave the characters will be modified accordingly.

A related procedure to the autocondensing process is automatic equalization of lines. That is, when the autoequalization feature is requested by the user, and a line has been autocondensed, step 238, all other lines of copy, for which the same font type and line height have been specified, will be condensed in width by the same amount by which the line, of that line height group having the greatest condensation, was condensed, step 240. In this manner, the appearance of the engraved workpiece has better balance. A further feature of the autocondense equalization procedure is that all lines of copy can be condensed by the condensation factor used for the most condensed line on the workpiece. An additional feature of autocondensing is that the user can specify that no autocondensing equalization be performed, that is, permitting each line to be condensed on its own merits. These features permit the user to control the graphic design and artistic nature of the resulting product, rather than having the copy be the controlling factor.

Once the line condensing procedure has been completed, the copy and copy parameters are formed into a data string for transfer to the control unit 12, step 242.

FIG. 4 illustrates the control, position, job reference and copy parameter data which is supplied by the intelligent terminal 10 to the control unit 12. In the multiple job embodiment of the present invention, the control, position, and copy parameters and user copy corresponding to a particular job are prefaced by the job reference parameter for that job, FIG. 4aa. This job reference parameter, as discussed above, directs the engraving tool to the position on the workpiece where the engraving of the particular job is to commence. In the preferred embodiment the job reference parameter and position parameters are combined and sent over as such. For each workpiece to be engraved, copy, control, and position parameters, in addition to the copy itself, are supplied for each line of copy, FIG. 4a. For each job, a set of initialization commands are included at the beginning of the string. In the multiple job embodiment, these initialization commands occur at the beginning of the string of jobs. The first several bytes of the data string for each line contain the control parameters which, when interpreted by the control unit, cause the engraving tool to be positioned at the start of the particular line on the work piece, FIG. 4b. The next several bytes designate the font style or table, which is to be used as the master font to engrave the copy, select reverse lettering, select italicizing and an italicizing slope, FIG. 4b. The next several bytes specify the proportions by which the master font is to be increased or reduced, FIG. 4b. The remaining bytes which follow are the actual copy to be engraved.

The bytes which specify the proportions by which the master font is to be modified include an expansion factor, an X reduction factor, and a Y reduction factor, FIG. 4c. The expansion factor is included so that the font memory requirements for the storage of the master font definitions in the control unit 12 can be kept small. Additionally, expansion of the master font definitions followed by a reduction of the X or the Y portion of the definition permits more precise reduction of the X or Y definition of the particular character. In the preferred embodiment to the present invention, the X and Y proportioning factors can range from between a 31% reduction to a 300% expansion. The X reduction factor is the quantity specified in connection with the auto condensing feature described above, step 236, FIG. 1.

In order for the intelligent terminal to determine the copy line width of a specific line of copy, the master font definitions for the specified font style should be available to the intelligent terminal 10. In practice, when the entire system is powered up, the control unit transfers the master font definitions for all font styles that it has to the intelligent terminal 10. In this manner, the intelligent terminal need not interrupt the operation of the control unit in order to obtain master font width information.

Also included within the control, position, and copy parameters are data bits which instruct the control unit to italicize, or reverse the engraving of the copy. These data bits, when interpreted by the control unit, cause the control unit to implement italicizing or reverse lettering features. As with the X-Y proportioning data, the reverse and italicizing data cause the control unit to modify the master font definitions for the particular character.

Returning to FIG. 1, the processing of the control, positioning, and copy parameters by control unit 12 will now be described. In step 244, the control unit retrieves a set of control, position, and copy parameters, as well as the copy to be engraved, from the intelligent terminal 10. In step 246, the control unit examines the various bytes of the command sequence to determine whether a control or position parameter or code is present. If so, the control unit proceeds to step 248 in which the control or position parameter is processed. Possible parameters include an instruction to raise or lower the engraving tool, to proceed to a specified X-Y coordinate point, to examine the control unit front panel for user control signals, to return to the home position (0,0), or to output a signal to the X-Y table 14 to shut off the stepping motors. When the parameter has been processed, the control unit returns to step 246.

If the byte is not a control or position parameter, the control unit examines the byte to determine whether it is a character which is to be engraved, step 248. If so, the control unit proceeds to step 250 in which the various font styles, italicizing, reverse lettering, and proportioning information are applied to the master font definitions obtained from the font memory.

The character processing step will now be described in more detail. In step 252, the control unit selects the current character to be engraved from the copy information and searches the font memory for the font definition for that character. This search is in the font memory area which corresponds to the font style which was designated in the copy parameter data. When the character definition is found, the control unit proceeds to step 254 in which counters are initialized with the number of bytes within the character definition to keep track of the definition process.

A master font character definition (see FIG. 4d) designates the order, number, and direction of steps in the X and Y coordinate directions necessary to engrave the specified character at a height of one-fourth inch, for example. The engraved code instructions can be broken down into several instruction types, including (1) a straight-line code, (2) a diagonal code, (3) a circular code, (4) a cutter-up code, (5) a cutter-down code, and (6) a digitized code. The particular code in the character definition is derived in step 256. In step 258, the control unit determines whether the engraved code found corresponds to a straight-line code. If so, the control unit proceeds to step 260 in which the straight-line code is processed.

Referring to FIG. 4e(1), the format of a straight line code is given. The first several bytes of the code specify the direction of the straight line, for example, up, down, left, or right. The second set of bytes specifies the number of steps to be executed in the particular direction. Also, in step 260, the X and Y proportions which were specified in the copy parameter data are examined to determine the expansion factor to be used. The character definition is then repeated however many times necessary in order to expand the character definition the specified amount.

In step 262, the expanded character definition is reduced in X and Y proportions according to the copy parameter reduction data so that a character of exact height and width specified will be obtained.

Referring to FIG. 9, this reduction step will now be described in greater detail. Reduction step 262 receives the expanded character definition, and reduces this definition so that the final engraved character is of the desired height and width. In step 400, the X reduction factor, the Y reduction factor, and the italicizing factor are obtained from the copy parameter data. In step 402, it is determined whether reverse lettering has been designated. If so, the direction of any X steps, which are present within a character definition, are reversed in step 404. After this modification step, the procedure returns to step 406. If, in step 402, it was determined that reverse lettering was not required, step 650 would be processed.

At this point, step 650, it is determined whether sideways lettering has been requested by the user. If so, the direction of any X steps, and the direction of any Y steps are reversed. In step 654, the X step and Y step are exchanged. For example, if in the unmodified font instruction, an X step but no Y step had been specified, step 654 would cause a Y step to be specified and no X step to be specified instead. After step 654, the control unit proceeds to step 406 for actual processing of the modified instructions. If, in step 650, no sideways lettering has been determined to have been specified, the control unit proceeds to step 656 in which it is determined whether a reverse/sideways lettering feature has been specified. If so, the control unit proceeds to step 658 in which only the X step direction is reversed. In step 670, the X step and the Y step are exchanged. The control unit then proceeds to step 650 and to the actual processing of the modified instructions.

In step 406 and the subsequent steps, the expanded set of steps is processed, step-by-step, to determine whether or not an X or a Y step is present. If in step 406, an X step is present, the X reduction factor, as opposed to a full step, is inserted into an X counter, step 408. In this manner, the expanded character definition is reduced to the proper size. For example, to obtain a 0.375 inch letter from a 0.25 inch font, the expansion factor could be three and the reduction factor 0.5. Therefore, for every expanded step received, the reduction factor of 0.5 will be inserted into the appropriate counter. In step 410, the state of the X counter is examined to determine whether the quantity within the counter is greater than one or less than negative one. Here, the counter is used as an accumulator, accumulating the steps received from step 408 until such time that a full step is present.

As used in the present invention, a negative step is defined as a step in the opposite direction of a positive step. If, in step 410, it is determined that the X counter quantity exceeds one, or is less than negative one, an X step coil pattern is output in step 412. Following step 412, or if no output step is required in step 410, step 414 is processed. In step 414, it is determined whether a Y step is present. If so, the Y reduction factor is inserted into a Y counter, step 416. As with the X counter, the Y counter is examined, in step 418 to determine whether its contents are greater than one, or less than negative one. If so, a Y step coil pattern is output in step 420.

At this point, an italicizing feature is implemented. In step 422, it is determined whether italicizing has been designated in the copy parameters. If so, for each Y step output in step 420, the italicizing factor is inserted into the X counter, step 424. In this manner, for every Y step out, a part of an X step is inserted in the character definition to cause an angling of vertical lines within the character. In this manner, the reduction step reduces, reverses, or italicizes the expanded character definition to obtain a character of the desired dimensions and orientation.

In steps 412 and 420, the control unit converts the modified character definition into coil patterns and transmit the coil patterns to the X-Y table 14.

Returning to step 258, if a straight-line code was not found, the control unit would proceed to step 266 in which an angle code is looked for. If an angle code was found, the control unit would proceed to process the angle code movement in steps 268, 262 and 264. An angle code format is shown in FIG. 4e(2). The first few bytes of the code designate the direction of the angled segment, for example, in the positive X direction and negative Y direction. The next few bytes are X, Y bit pairs which define the angle of the code movement. For example, a line at an angle of 45 degrees can be defined by a bit pair of one, one. The next few bits specify the number of times the X, Y bit pairs are to be processed. The last few bytes define finishing steps.

If no angle code was found in step 266, the control unit would proceed to step 270 in which a circle code is looked for. If a circle code was found, the control unit would proceed to step 272 in which the circle code would be processed.

Referring to FIG. 4e(3), a format of the circle code is shown. The first few bytes of the circle code designate the direction in which the circle is to be engraved, for example, clockwise or counter clockwise; and the quadrant or position of the circle. The next few bytes designate the radius of the circle, followed by several bytes designating an oval number. The oval number is used much like the reduction factor in the reduction step 262 to expand or reduce the value of X step within the circle definition so that an oval can be obtained. Following the oval number bytes, are several bytes which specify the number of steps which are to be blanked before engraving of the circle code is to commence. This is so that letters such as an "e" or a "c" can be engraved using this code. The final bytes of the circle code format indicate the number of steps required to define the particular circle.

In the present invention, the circle code tables provide a circle definition which comprises the steps necessary to generate one quadrant of a circle. The circle code processing step 272 includes provisions to modify the directional instruction within the character definition so that the other quadrants of the circle can be generated. For example, if a circle were defined in the positive X, positive Y quadrant, a simple change in sign of the X step definition would result in the negative X, positive Y quadrant of the circle. In step 274, a smoothing routine is implemented in the event that the circle definition is being expanded. Whenever a circle definition is expanded, the character engraved from such instructions can take on a jagged appearance. The smoothing routine in step 274 becomes operative whenever an expanded circle is specified, and examines the number of steps in the X-axis and Y-axis, as specified by the circle code definition and modifies these steps according to a smoothing procedure. The amount of smoothing implemented is a function of the expansion factor of the circle specified. For example, for a circle having a diameter of two inches, the smoothing routine could specify that for every 13 steps in the X direction, four steps in the Y direction will be added to the instruction. In this manner, no prolonged string of steps in any X or Y direction will occur, without some movement in the other axis. FIG. 5 is a flow diagram of the smoothing routine. In step 271 the expansion factor for the circle is examined to determine if it exceeds a certain minimum. If the minimum is exceeded, a threshold number is obtained in step 273 from a look-up table, as a function of the amount of expansion. As the circle instruction is incremented, step 275, the actual X and Y steps designated by the expanded circle definition are counted and totaled, step 277. If in step 279 the threshold number is exceeded, step 281 examines the number of X steps accumulated to this point and the number of Y steps accumulated to this point. If the number of X steps are greater than the number of Y steps, the X step total is divided by two and loaded into an X counter, in step 283. In step 285, the number of Y steps, unaltered, are loaded into a Y counter. If, in step 281, the number of Y steps is determined to be greater than the number of X steps, the Y step total is divided by two and loaded into a Y counter, step 287. In step 289, the X step total is loaded into an X counter, unaltered. After step 289 or 285, both the X and Y counters are decremented simultaneously. For each time the X and Y counters are decremented, the contents of each counter are examined to determine whether they are equal to zero. If, in step 293, the X counter has been decremented to zero, step 295 is executed. In step 295, a Y step is output and the #Y steps is decremented. In step 297, an output step counter is incremented to record the output of a step in step 295. In step 299, the X counter is reset to the original number of X steps, see step 281. After step 299, or if the X counter has not reached zero in step 293, the Y counter is examined to determine whether its contents equal zero, step 301. If so, an X step is output in step 303, and the #X steps is decremented and the output step counter is incremented in step 305. In step 307, the Y counter is reset to the original number of Y step, see step 281. After step 307, or if the Y counter had not reached zero in step 301, the contents of the output step counter are examined, see step 309. If the contents of the output step counter do not exceed the "steps number" obtained in step 273, the procedure returns to step 291 to continue decrementing the X and Y counters. If, on the other hand, the contents of the output step counter exceed the steps number, it is determined in step 311, whether all of the steps in the character definition have been processed. If so, the next step in the overall procedure, FIG. 1, is executed. If the character has not been fully processed, the procedure returns to step 275 and continues to increment through the character instruction.

In the above manner, the smoothing procedure specifies a smoothing factor depending upon the expansion factor of the character chosen. This smoothing factor is implemented within the procedure by the examination of the trend of the X and Y steps and by inserting at appropriate points output steps which cause the trend to smooth what would otherwise be a stair-step pattern.

If, in step 270, a circle code was not found, the control unit would proceed to step 276 in which a cutter-up/down code would be looked for. The cutter-up code is necessary to permit the tool to move from one character to the next character. The cutter-down code positions the cutter on the workpiece after the positioning steps have occured. In step 278 a cutter-up or cutter-down instruction is inserted into the output line to the cutter, along with a delay, determined in step 280. This delay acts to permit the cutter to be raised or lowered before further instructions are processed. This prevents, for example, the engraving of a character before the cutter makes contact with the workpiece.

In the multiple job embodiment of the present invention, the cutter delay as discussed above has been modified so that the delay is variable, and under user control. In this manner the user can optimize the amount of time by which the processing is delayed when the cutter is raised or lowered, according to the particular engraving conditions. For example, where a metallic workpiece is being engraved upon, the speed at which the cutter is raised and lowered is typically adjusted to be slower than that used for engraving plastics, in such case, the amount of delay required to permit the cutter to be lowered to the workpiece before further processing of the job is ordered, is longer. On the other hand, when plastics are being engraved, thereby permitting faster cutter-lowering speeds to be used, the delay can be made smaller. In this manner, the user can optimize the time delay according to the conditions under which the cutter is operating. The implementation of this user-variable delay feature is explained in greater detail in the discussion of the preferred embodiment of the apparatus of the present invention.

In step 282, the control unit looks for a digitized code designation. See FIG. 4e(4). If such a code is found, the control unit proceeds to step 284 in which the digitized codes are processed. A digitized code is one wherein a pattern is specified in X-Y coordinate pairs. See FIG. 4f. For example, a flourish can be designated by X and Y coordinate pairs, as can a box or other symbol.

After all digitized pairs have been processed, the control unit returns from step 284 and proceeds to the smoothing step 274 and the reduction step 262.

After all instructions corresponding to a character have been processed, reduced, and converted to coil patterns, the control unit returns to step 246, and continues to search for control or character codes. In step 286, the control unit determines whether an end-of-job code is present. If no end-of-job code is present, an error is indicated and the control unit proceeds to step 288 in which it halts its operation. If an end-of-job code is encountered, the control unit returns to step 244 in which it attempts to obtain the next command sequence from the intelligent terminal 10.

In the method of the present invention, each step output in step 412 or 420 is converted into the particular coil patterns which will produce the desired rotation in the desired direction. To do this, a determination of the magnitude and direction of the rotation is made. From a look-up table, the necessary coil patterns are selected. The sequence of coil patterns are then supplied to the stepper motors on the X-Y table.

Recall that the stepper motors in the X-Y table each drive a lead screw. The rotation of the stepper motors, when transferred to the lead screws, cause the table and engraving tool to move the desired amount of incremental steps in the desired direction. The control signals to the X-Y table direct the positioning of the engraving tool with respect to the workpiece.

In the preferred embodiment of the present invention, provision is made for user interaction with the procedure at various stages. At the point where control, position, and copy parameters and copy have been transferred to the control unit, the procedure permits the user to interrupt the processing of the parameters and copy. This provision is implemented through the use of switches on the front panel of the control unit 12. For example, should the engraving tool become misaligned, or the work piece become mispositioned, the user can activate a halt-processing switch to stop the processing of the current job until the problem has been corrected. Other switches include a home and cancel switch which cause the job to be aborted and the tool to return to the home position. A home and re-start switch causes the tool to stop processing the current point in the job and to return home and start the job from the very beginning. A cutter-up/down switch permits the cutter to be raised from the work piece while corrections are made to the work piece. A power-saver switch causes the stepper motor to be turned off at the end of a job.

In the operation of stepper motors, the stepper motor coils are energized even when the stepper motor is not moving. Depending upon the last set of coils to be energized, the idling of a stepper motor in a particular position may correspond to a very high current drain due to the number of coils being energized. In the preferred embodiment of the present invention, the control unit causes the coil sequence with the fewest number of coils energized to be applied to the stepper motor when the power-saver switch is off and the engraver is at its home position. In the usual stepper motor application, this feature is not easily implemented since the stepper motor drivers normally used involves a direct conversion of data into coil patterns. In the present invention, this translation of data into coil patterns includes a provision for inserting coil patterns apart from the data being translated, and for storing the current pattern being output. In the power saver mode, a coil pattern which requires the fewest number of coils to be energized is selected and output to the stepper motors, thus reducing the idling current requirements.

In addition, because the exact position of the stepper motor is known at all times, even after all power has been removed from the stepper motor driver, the position of the engraver will not change upon reapplication of the power. In the preferred embodiment of the present invention, when the power saver switch is on, all power is removed from the coils. In the usual stepper motor driver circuitry, containing the coil pattern translators, a removal of power to the stepper motors could result in the movement of the stepper motors out of the desired position when power was re-applied.

Previous stepper motor driver and the translator circuitry also included circuitry for slewing the stepper motor from one position to another. This slewing is typically performed when an engraving tool is being moved into position from which to start the engraving process. As such the parameters of the slewing circuitry were selected according to the characteristics of the particular stepper motors used. This was so because, in order to prevent step-skipping by the stepper motors, the rate at which the stepper motor speed was increased had to be kept below a maximum rate, determined by the characteristics of the particular stepping motor. As such, the slewing circuitry had to be custom designed for the particular stepper motor used.

In the present invention, the slewing rate can be specified. As such, the rate at which a stepper motor is slewed can be changed according to the particular stepper motor being used. No custom designed circuitry is required.

Another feature of the method of the present invention, in connection with stepper motor slewing, is the control of the slewing of both the X and the Y stepper motors at one time. The method includes the procedure of supplying the X and Y stepper motor slewing signals through independent counters. These assigned counters are loaded with counts which correspond to the point where a change is required in the signal to slow the slewing rate, to increase it, or to halt it. Each counter proceeds to be counted down independently of the other and as a function of the slewing of the particular axis to which it corresponds. When a particular count has reached zero, a decision is made in the main processing loop as to the rate at which to operate the particular motor and for the number of steps. Until that time, the stepper motors are slewed by the counter counts and independently of the main processing loop. This simultaneous monitoring of the slewing of both axes is implemented in the apparatus of the present invention through the use of programmable counters. One counter each is assigned to the X and the Y axis. For the initial starting position and the final end point, a predetermined count is loaded into each programmable counter. These counts correspond to the point at which the slewing rate of each stepper motor must be changed. The slewing of both axes is initiated and the count on each programmable counter is monitored until such time that the count in a counter has transpired. At that time, the slew rate of the corresponding stepper motor are modified accordingly.

Figure 8:
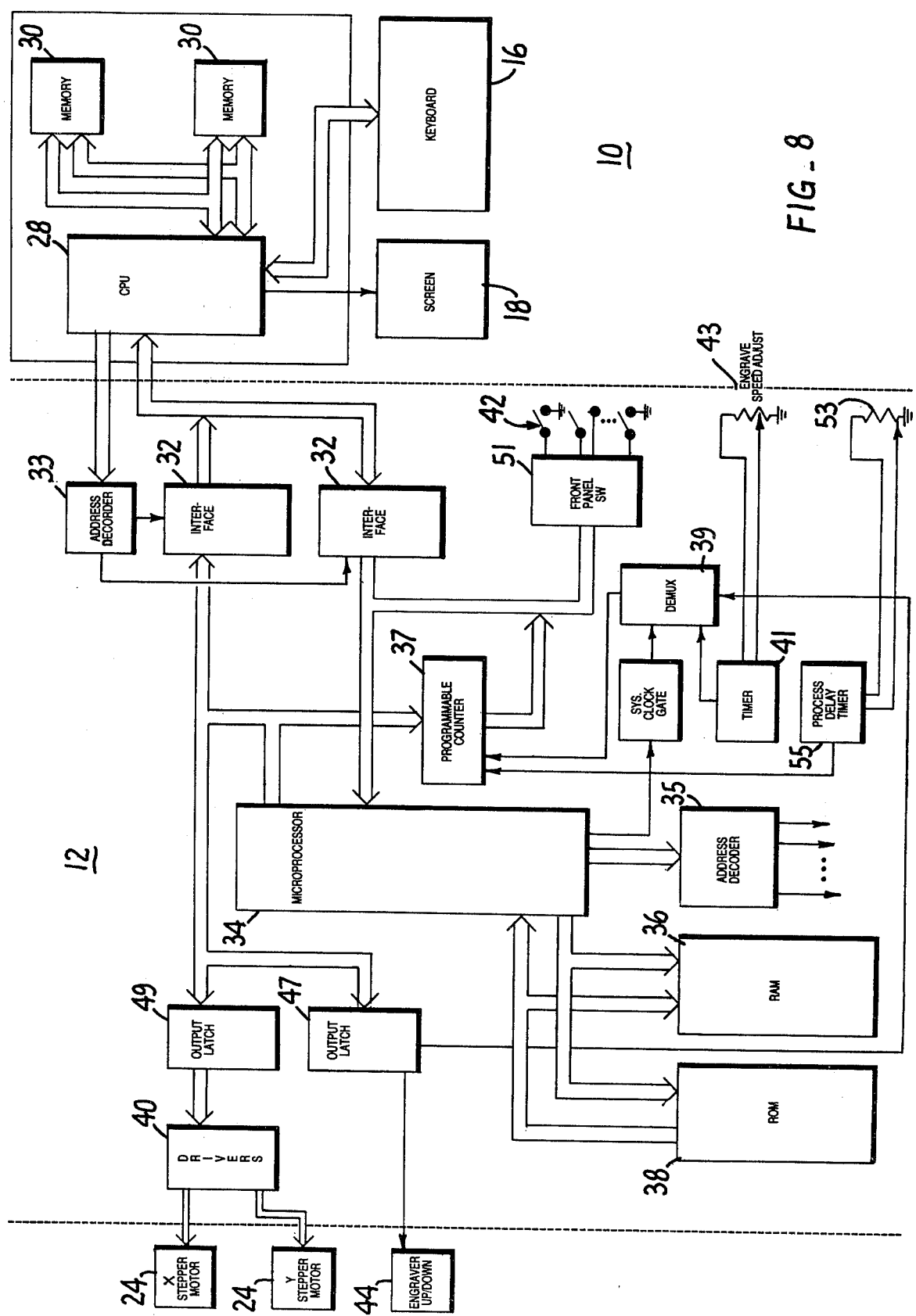
FIG. 8 is a generalized block diagram of the apparatus of the present invention illustrating the functional blocks within each component of the present invention.

In operation, the apparatus of the present invention is one implementation of the method of computer controlled engraving. See FIG. 8. Generally, the tasks are divided between two computer systems. The first computer system operates upon user information to provide the control, positioning, and copy parameters. The second computer operates upon a set of master fonts using the information supplied by the first computer. The second computer converts the modified font information into drive signals which are then used to operate a mechanical tool manipulating means. The intelligent terminal 10 receives information from the user via keyboard 16. Communication with the user is accomplished via screen 18. Included within the intelligent terminal is a central processing unit 28 and various memories 30 which contain the programs for directing the manipulation of the user-supplied information. A listing of the program which implements that portion of the engraving method of the present invention which is executed within the intelligent terminal is contained in Appendix A. This listing comprises two parts: the first part being in the BASIC language, and the second being in ASSEMBLY language. The intelligent terminal 10 is bi-directionally coupled to the control unit 12 through interface circuitry 32.

Included within the control unit 12 are a microprocessor 34, random access memory 36, and read-only memory 38. Read-only memory 38 includes control program information, as well as master fonts and circle tables. Also included within the control unit are drivers 40 to drive the stepping motors 24 within the X-Y table 14, according to coil patterns supplied by the microprocessor 34. Included on the front panel of the control unit 12 are user switches 42 which permit the user to interrupt the control unit 12 and X-Y table 14 processing. Interface 51 receives the values of the front panel switches 42, and relays the values to the microprocessor 34.

Address decoder 33 receives address information from the intelligent terminal 10 to enable the specified interface circuits 32. Address decoder 35 receives address information from microprocessor 34 to provide selection signals to the various components in the control unit 12.

Programmable counter 37 receives programmed-count values from the microprocessor 34 and supplies outputs for several functions including stepper motor slewing control as described previously and engraving speed adjust. Programmable counter 37 is supplied with a clock signal from demultiplexer 39. Demultiplexer 39 is supplied with two clock signals, the system clock from microprocessor 34, and a user-controlled clock from timer circuit 41. A potentiometer 43 located on the front of the control unit permits the user to adjust the timer 41 frequency. The output of demultiplexer 39 is determined by a signal on line 45, from output latch 47.

In the multiple job embodiment of the present invention, an additional user controlled feature is provided in the control unit. A delay potentiometer 53 is located on the front panel of the control unit. This delay potentiometer is connected to a process delay timer 55 which in turn is connected to the programable counter 37. When the cutter up/down control code is processed, the programable counter is instructed to use the count emerging from the process delay timer 55 to delay the processing of the next instruction in the instruction set. User variation of the delay potentiometer 53 causes a variation in the process delay timer output. This in turn causes the variation in the length of time which elapses before programable counter 37 permits the next instruction to be processed. In this manner, the user-variable delay is implemented.

Output latch 47 receives up/down control data, and demultiplexer select commands from the microprocessor 34. Output latch 49 receives stepper motor coil signals from the microprocessor 34, which in turn are supplied to stepper motor drivers 40. The listing of the program which implements the control, position, and copy parameter processing, the font modification, and the coil pattern conversion steps of the method of the present invention, steps 244–288 is given in Appendix B. This listing is in ASSEMBLY language.

X-Y table 14 receives drive signals from the control unit 12 for controlling the X coordinate movement of the table 20, Y coordinate movement of the engraving tool 24, and the up-down motion of the engraving tool itself 44.

Implementation of a computer controlled engraving system and method as described above permits much flexibility in specifying characters and formats. For example, a utility font which includes master font instructions for characters such as square cornered boxes or round cornered boxes can be stored within the control unit. The square cornered box character can be specified by the user as a single character on a particular line with its size specified such that the auto-condensing feature would cause the character to be condensed so that its edges correspond to the margins of the work piece. As such, a border can be implemented using a minimal number of instructions.

Additionally, because the preferred embodiment of the present invention is implemented as an intelligent terminal/ control unit interactive system, the intelligent terminal can be used to insert additional master fonts to the control unit. As such, the user can maintain certain commonly used master fonts within the control unit, while maintaining a library of less often used master fonts in a separate memory such as cassette tape, or floppy disk. Whenever the less often used master font is desired, the user can insert such master font into the control unit random access memory by way of the intelligent terminal and intelligent terminal instructions to the control unit to do so.

A further feature of the intelligent terminal/control unit interactive system of the preferred embodiment of the present invention is that the intelligent terminal can be instructed to store any jobs being currently processed into an external memory such as a cassette tape or a floppy disk or any other information storage medium. As such, whenever a particular application for the specific job arises in the future, the user can simply retrieve the corresponding cassette tape, or any other information storage medium, and reinsert the whole job back into the system for processing. Additionally, job information can come from other sources, such as another off-site intelligent terminal.

In the control unit, the line-by-line processing of each job, permits a "back-up line" feature to be implemented within the control unit. A "back-up line" control is located on the front panel and the activation of such control causes the internal processing circuitry to back-up to the previously processed line of copy in the job. Such feature is useful when the cutter backs-out during the processing of a job, and the line is required to be re-engraved. Instead of returning to the start of the job the cutter is simply moved to the previous line and the engraving restarted from that point. The use of such feature greatly reduces the time required to make correction in the engraving process. Similarly, processing can be "back-up" to the beginning of a job or to a previous job and is implemented in the present invention by a "back-up plate" switch.

It is to be understood that the method of engraving disclosed herein is equally applicable to the manipulation of machines or tools in addition to an engraving tool. For example, in place of an engraving tool, a sewing fixture can be substituted with a cloth work piece located on the work table. As such, the intelligent terminal and control unit can be instructed to cause the sewing machine to sew any number of patterns onto the work piece. Other tools could be substituted to perform other functions such as burning, welding, milling and etching.

The terms and expressions which have been employed here are used as terms of description and not of limitation, and there is no intention, in the use of such terms and expressions of excluding equivalents of the features shown and described, or portions thereof, it being recognized that various modifications are possible within the scope of the invention claimed.

What is claimed is:

1. A method of manipulating a tool of the type in which a tool is positionally manipulated with respect to a workpiece and in accordance with dimensional and copy information supplied by a user, the dimensional and copy information originating from a plurality of separate and distinct jobs wherein the copy information includes a plurality of characters including the steps of generating a plurality of position and control parameters which are based upon the user-supplied dimensional information;

generating a plurality of copy parameters which are based upon the dimensional information and the user-supplied copy information;

generating a job reference parameter for each job which is indicative of the physical location of the associated job on the workpiece;

transferring the control, position, copy and job reference parameters and the user-supplied copy information to a control means;

transforming the position, control and job reference parameters into drive signals wherein for each job the corresponding drive signals are referenced to the associated job reference parameter;

selecting master font instructions, from a master font memory within the control means, which selected master font instructions correspond to the characters in the user-supplied copy information wherein the master font memory stores a plurality of the master font instructions, each of which prescribes tool movements to produce one of a predesignated plurality of different characters;

modifying the selected master font instructions according to the copy parameters;

converting the modified master font instructions into drive signals wherein for each job, the corresponding drive signals are referenced to the associated job reference parameter;

transferring all drive signals to a tool manipulating means;

positioning the tool according to the position and job reference drive signals; and manipulating the tool in accordance with the control and modified-copy instruction drive signals, so that each separate and distinct job is performed on the same workpiece.

2. The method of manipulating a tool, as recited in claim 1, wherein the control and position parameter generating step further includes the steps of receiving a "number of columns" specification;

receiving a "maximum column width" specification corresponding to each column specified;

receiving workpiece dimensions;

receiving a "justification" specification corresponding to each column;

receiving the line count information;

generating the position and control parameters according to to the "number of columns", the "maximum column width," "justification" and line count information to obtain dimensional specifications for a columnar layout.

3. The method of manipulating a tool, as recited in claim 1, wherein the job reference parameter generating step includes the steps of determining the space requirement for each separate and distinct job in accordance with the user-supplied dimensional information;

determining the space available on the work piece in accordance with the user-supplied dimensional information;

allocating a work piece location for each separate and distinct job; and determining the job reference parameter for each job, the job reference parameter including a reference point on the work piece from which each job is to be performed.

4. The method of manipulating a tool, as recited in claim 1, wherein the job reference determination step further includes the step of assigning the same reference point for each separate and distinct job.

5. The method of manipulating a tool, as recited in claim 1, in which a number of separate and distinct jobs are being processed, and further wherein the copy parameter generating step further includes the steps of receiving a number of serial number specifications from the user, the serial number specifications including an "increment", a "line number", a "surrounding copy", a "length" and a "starting number" specification;

generating a line of copy which includes a serial number, the serial number being determined according to the user-supplied serial number specifications, the line of copy being included with the user-supplied copy; and incrementing the serial number for each job processed according to the user-supplied serial number specifications.

6. The method of manipulating a tool, as recited in claim 1, wherein a master font instruction includes an X-step and direction, a Y-step and direction, and further wherein modification of the master font step further includes the step of reversing the Y-step direction for each instruction and exchanging the X-step and Y-step for each instruction so that a character which is reversed and sideways in orientation is produced.

7. The method of manipulating the tool, as recited in claim 6, wherein the modification of the master font step further includes the step of reversing the X-directions step to produce a character which is sideways in orientation.

8. The method of manipulating a tool, as recited in claim 1, wherein the drive signals which are transferred from the control means to the tool manipulating means include a cutter-up and a cutter-down drive signal, and further wherein the drive signal transferring step further includes the step of delaying, by a specified interval, the further processing of the job following a cutter-down drive signal, and the step of delaying by the specified interval, the further processing of the job instruction following a cutter-up drive signal, the specified interval being adjustable by the user.

9. An apparatus for manipulating a tool with respect to a workpiece in which a tool is manipulated by electronic means and in accordance with dimensional and copy information supplied by a user, the dimensional and copy information originating from a plurality of separate and distinct jobs the tool manipulating system comprising an intelligent terminal for receiving the information from the user, and for generating control, position and copy parameters, the terminal including means for generating a plurality of different dimensional layouts in accordance with the user-supplied information, and for converting the generated layouts into control, position and copy parameters and for generating a job reference parameter for each job which is indicative of the physical location of the associated job on the workpiece;

a control unit, which is communicatively coupled to the intelligent terminal, the control unit receiving the control, position, job reference, and copy parameters and the copy information from the terminal, and supplying font information to the terminal, the control unit including font memory means for supplying a plurality of master font definitions, each of which prescribes tool movements to produce one of a predesignated plurality of different characters;

processing means coupled to the font memory means for interpreting the position and control parameters, for selecting master font instructions from the master font memory which correspond to the characters within the user-supplied copy information, for modifying the selected master font definitions according to the copy parameters, and for generating drive signals in accordance with control, job reference, and position parameters and the modified master font definitions, wherein for each job the corresponding drive signals are referenced to the associated job reference parameter; and mechanical tool manipulating means responsive to the drive signals from the control unit, the mechanical tool manipulating means including the tool and means for manipulating the position of the tool in accordance with the drive signals, so that each separate and distinct job is performed on the same workpiece.

10. The tool manipulating apparatus, as recited in claim 9, wherein dimensional and copy information are supplied by the user including a "number of columns" specification, a "maximum column width" specification, a line count, a "justification" specification corresponding to each column, and work piece dimensions, and further wherein the dimensional layout generating means automatically determines position and control parameters for a columnar layout in accordance with the user supplied specifications.

11. The tool manipulating apparatus, as recited in claim 9, wherein the master font instruction includes an X-step and direction and a Y-step and direction and further wherein the processing means in the control unit is capable of exchanging the X step and Y step instruction for each master font instruction processed and capable of reversing the Y-step direction for each instruction processed so that a character which is reversed and sideways in orientation is produced.

12. The tool manipulating apparatus, as recited in claim 11, wherein the processing means of the control unit is further capable of reversing the X step direction for each master font instruction processed so that a character which is sideways in orientation is produced.

13. The tool manipulating apparatus, as recited in claim 9, in which a number of separate and distinct jobs are being processed, and wherein the intelligent terminal receives a number of serial number specifications from the user, the serial number specifications including an "increment", a "line number", a "surrounding copy", a "length" and a "starting number" specification, and further wherein the intelligent terminal includes means for generating a line of copy which includes a serial number, the serial number being determined according to the user-supplied serial number specifications, the line of copy being included with the user-supplied copy, and for incrementing the serial number for each job processed according to the user-supplied serial number specifications.

14. The tool manipulating apparatus, as recited in claim 9, in which the tool can be raised from and lowered to the workpiece at a predetermined speed wherein the control unit further includes a plurality of front panel controls for user control and interrupt of the control unit and mechanical engraving means when a job is in progress, the front panel controls including a user adjustable process delay control, for delaying the job processing whenever the tool is raised from or lowered to the workpiece, so that the delay can be optimized to the speed at which the tool is raised or lowered.

15. A method of manipulating a tool of the type in which a tool is positionally manipulated with respect to a workpiece and in accordance with dimensional and copy information supplied by a user, the dimensional and copy information originating from a plurality of separate and distinct jobs wherein the user-supplied dimensional information includes a "number of columns" specification, a "maximum column width" specification and a "justification" specification which correspond to each column, workpiece dimensions and line count information, including the steps of generating a plurality of position and control parameters which are based upon the user-supplied dimensional information;

generating a plurality of copy parameters which are based upon the dimensional information and the user-supplied copy information wherein the position and control parameters are generated according to the "number of columns," the "maximum column width," the "justification" and line count information to obtain dimensional specifications for a columnar layout;

generating a job reference parameter for each job;

transferring control, position, copy and job reference parameters and user-supplied copy information to a control means;

transforming the position, control and job reference parameters into drive signals;

obtaining master font instructions, which correspond to the user-supplied copy, from a master font memory within the control means;

modifying the master font instructions according to the copy parameters;

converting the modified copy instructions into drive signals;

transferring all drive signals to a tool manipulating means;

positioning the tool according to the position and job reference drive signals; and manipulating the tool in accordance with the control and modified-copy instruction drive signals, so that each separate and distinct job is performed on the same workpiece.

16. A method of manipulating a tool of the type in which a tool is positionally manipulated with respect to a workpiece and in accordance with dimensional and copy information supplied by a user, the dimensional and copy information originating from a plurality of separate and distinct jobs including the steps of generating a plurality of position and control parameters which are based upon the user-supplied dimensional information;

generating a plurality of copy parameters which are based are based upon the dimensional information and the user-supplied copy information;

generating a job reference parameter for each job including the steps of determining the space requirement for each separate and distinct job in accordance with the user-supplied dimensional information;

determining the space available on the workpiece in accordance with the user-supplied dimensional information;

allocating a workpiece location for each separate and distinct job; and determining the job reference parameter for each job, the job reference parameter including a reference point on the workpiece from which each job is to be performed;

transferring control, position, copy and job reference parameters and user-supplied copy information to a control means;

transforming the position, control and job reference parameters into drive signals;

obtaining master font instructions, which correspond to the user-supplied copy, from a master font memory with the control means;

modifying the master font instructions according to the copy parameters;

converting the modified copy instructions into drive signals;

transferring all drive signals to a tool manipulating means;

positioning the tool according to the position and job reference drive signals; and manipulating the tool in accordance with the control and modified-copy instruction drive signals, so that each separate and distinct job is performed on the same workpiece.

17. A method of manipulating a tool of the type in which a tool is positionally manipulated with respect to a workpiece and in accordance with dimensional and copy information supplied by a user, the dimensional and copy information originating from a plurality of separate and distinct jobs, wherein the user-supplied copy information includes a number of serial number specifications comprising an "increment," a "line number," a "surrounding copy," a "length" and a "starting number" specification, including the steps of generating a plurality of position and control parameters which are based upon the user-supplied dimensional information;

generating a plurality of copy parameters which are based upon the dimensional information and the user-supplied copy information including the steps of generating a line of copy which includes a serial number, the serial number being determined according to the user-supplied serial number specifications, the line of copy being included with the user-supplied copy; and incrementing the serial number for each job processed according to the user-supplied serial number specifications;

generating a job reference parameter for each job;

transferring control, position, copy and job reference parameters and user-supplied copy information to a control means;

transforming the position, control and job reference parameters into drive signals;

obtaining master font instructions, which correspond to the user-supplied copy, from a master font memory with the control means;

modifying the master font instructions according to the copy parameters;

converting the modified copy instructions into drive signals;

transferring all drive signals to a tool manipulating means;

positioning the tool according to the position and job reference drive signals; and manipulating the tool in accordance with the control and modified-copy instruction drive signals, so that each separate and distinct job is performed on the same workpiece.

18. A method of manipulating a tool of the type in which a tool is positionally manipulated with respect to a workpiece and in accordance with dimensional and copy information supplied by a user, the dimensional and copy information originating from a purality of separate and distinct jobs including the steps of generating a plurality of position and control parameters which are based upon the user-supplied dimensional information;

generating a plurality of copy parameters which are based upon the dimensional information and the user-supplied copy information;

generating a job reference parameter for each job;

transferring control, position, copy and job reference parameters and user-supplied copy information to a control means;

transforming the position, control and job reference parameters into drive signals;

obtaining master font instructions, which correspond to the user-supplied copy, from a master font memory with the control means;

modifying the master font instructions according to the copy parameters;

converting the modified copy instructions into drive signals;

transferring all drive signals to a tool manipulating means wherein the drive signals which are transferred from the control means to the tool manipulating means include a cutter-up and a cutter-down drive signal, and further wherein the drive signal transferring step further includes the step of delaying, by a specified interval, the further processing of the job following a cutter-down drive signal, and the step of delaying by the specified interval, the further processing of the job processing following a cutter-up drive signal, the specified interval being adjustable by the user;

positioning the tool according to the position and job reference drive signals; and manipulating the tool in accordance with the control and modified-copy instruction drive signals, so that each separate and distinct job is performed on the same workpiece.

19. An apparatus for manipulating a tool with respect to a workpiece in which a tool is manipulated by electronic means and in accordance with dimensional and copy information supplied by a user, the dimensional and copy information originating from a plurality of separate and distinct jobs wherein the user-supplied dimensional and copy information include a "number of columns" specification, a "maximum column width" specification, a line count, a "justification" specification corresponding to each column, and workpiece dimensions, the tool manipulating system comprising an intelligent terminal for receiving the information from the user, and for generating control, position and copy parameters, the terminal including means for generating a plurality of different dimensional layouts in accordance with the user-supplied information and for converting the generated layouts into control, position and copy parameters and for generating a job reference parameter for each job wherein the dimensional layout generating means automatically determines position and control parameters for a columnar layout in accordance with the user-supplied specifications;

a control unit, which is communicatively coupled to the intelligent terminal, the control unit receiving the control, position, job reference and copy parameters and copy information from the terminal, and supplying font information to the terminal, the control unit including font memory means for supplying a plurality of master font definitions; and processing means for interpreting the position and control parameters, for modifying master font definitions for the copy according to the copy parameters, and generating drive signals in accordance with control, job reference, and position parameters and the modified master font definitions; and mechanical tool manipulating means responsive to the drive signals from the control unit, the mechanical tool manipulating means including the tool and means for manipulating the position of the tool in accordance with the drive signals, so that each separate and distinct job is performed on the same workpiece.

20. An apparatus for manipulating a tool with respect to a workpiece in which a tool is manipulated by electronic means and in accordance with dimensional and copy information supplied by a user, the dimensional and copy information originating from a plurality of separate and distinct jobs the tool manipulating system comprising an intelligent terminal for receiving the information from the user, the copy information including a number of serial number specifications, the serial number specifications including an "increment," a "surrounding copy," a length" and a "starting number" specification, and for generating control, position and copy parameters, the terminal including means for generating a plurality of different dimensional layouts in accordance with the user-supplied information and for converting the generated layouts into control, position and copy parameters and for generating a job reference parameter for each job; and means for generating a line of copy which includes a serial number, the serial number being determined according to the user-supplied serial number specifications, the line of copy being included with the user-supplied copy, and for incrementing the serial number for each job processed according to the user-supplied serial number specification;

a control unit, which is communicatively coupled to the intelligent terminal, the control unit receiving the control, position, job reference and copy parameters and copy information from the terminal, and supplying font information to the terminal, the control unit including font memory means for supplying a plurality of master font definitions;

processing means for interpreting the position and control parameters, for modifying master font definitions for the copy according to the copy parameters, and generating drive signals in accordance with control, job reference, and position parameters and the modified master font definitions; and mechanical tool manipulating means responsive to the drive signals from the control unit, the mechanical tool manipulating means including the tool and means for manipulating the position of the tool in accordance with the drive signals, so that each separate and distinct job is performed on the same workpiece.

21. An apparatus for manipulating a tool with respect to a workpiece in which a tool is manipulated by electronic means and in accordance with dimensional and copy information supplied by a user in which the tool can be raised from and lowered to the workpiece at a predetermined speed, the dimensional and copy information originating from a plurality of separate and distinct jobs the tool manipulating system comprising an intelligent terminal for receiving the information from the user, and for generating control, position and copy parameters, the terminal including means for generating a plurality of different dimensional layouts in accordance with the user-supplied information and for converting the generated layouts into control, position and copy parameters and for generating a job reference parameter for each job;

a control unit, which is communicatively coupled to the intelligent terminal, the control unit receiving the control, position, job reference and copy parameters and copy information from the terminal, and supplying font information to the terminal, the control unit including font memory means for supplying a plurality of master font definitions;

processing means for interpreting the position and control parameters, for modifying master font definitions for the copy according to the copy parameters, and generating drive signals in accordance with control, job reference, and position parameters and the modified master font definitions; and plurality of front panel controls for user control and interrupt of the control unit when a job is in progress, the front panel controls including a user adjustable process delay control, for delaying the job processing whenever the tool is raised from or lowered to the workpiece, so that the delay can be optimized to the speed at which the tool is raised or lowered; and mechanical tool manipulating means responsive to the drive signals from the control unit, the mechanical tool manipulating means including the tool and means for manipulating the position of the tool in accordance with the drive signals, so that each separate and distinct job is performed on the same workpiece.

* * * * *